March 4, 1958 — A. J. BARTA ET AL — 2,825,587
PIPE-IN-SOCKET COUPLING FOR SLOTTED END CONDUITS
Filed Nov. 3, 1954
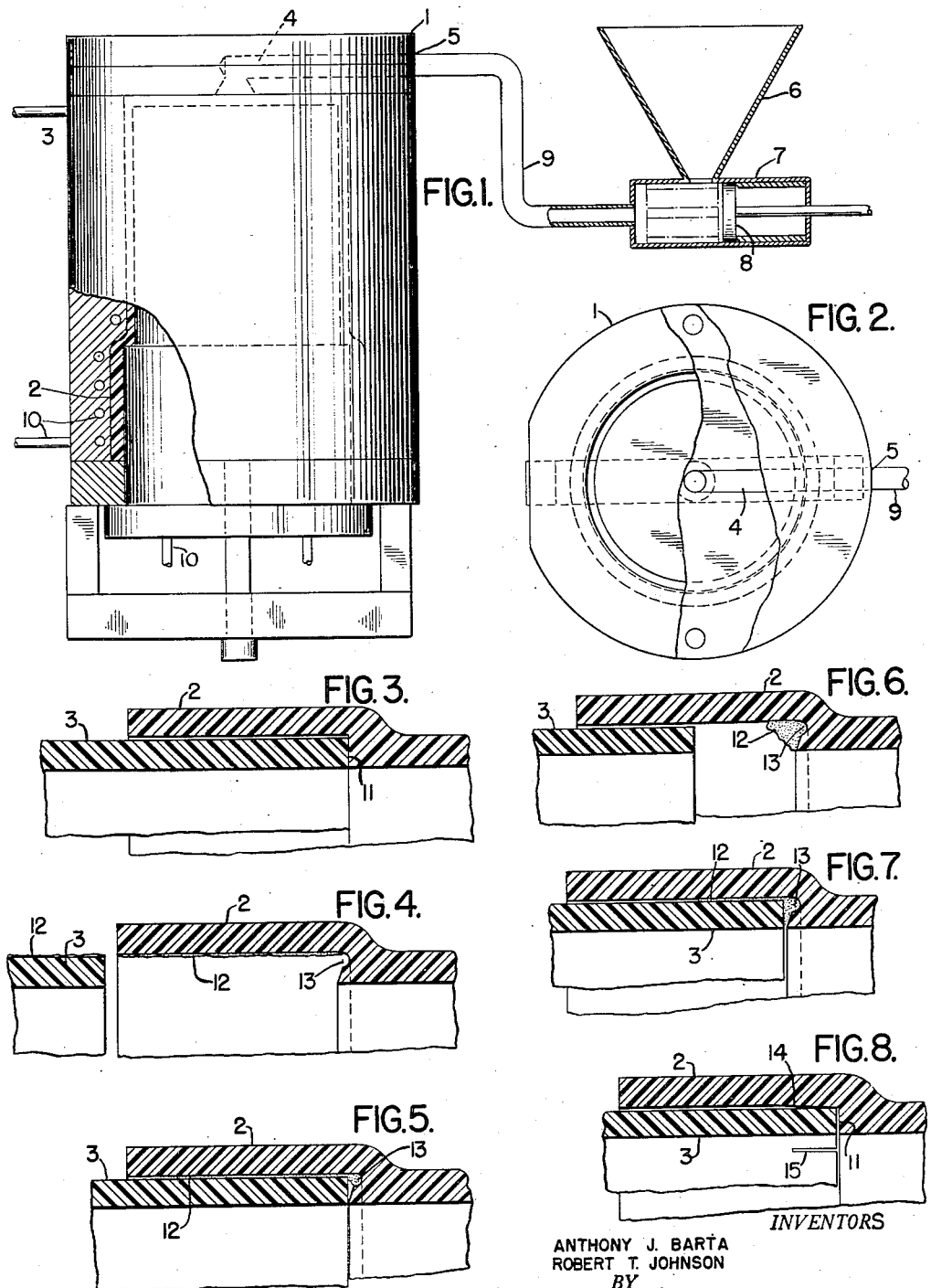
INVENTORS
ANTHONY J. BARTA
ROBERT T. JOHNSON
BY
Attorneys

# United States Patent Office 2,825,587
Patented Mar. 4, 1958

2,825,587

PIPE-IN-SOCKET COUPLING FOR SLOTTED END CONDUITS

Anthony J. Barta, Glenbeulah, and Robert T. Johnson, Plymouth, Wis., assignors to Plymouth Industrial Products, Inc., Plymouth, Wis., a corporation of Wisconsin Application November 3, 1954, Serial No. 466,592

2 Claims. (Cl. 285—284)

This invention relates to ducts and to a joint therefor.

Metal pipe has certain disadvantages for many uses. For example in heat ducts there is a high heat loss, in ventilating ducts sound is carried throughout the system, and for air conditioning there is rust and corrosion caused by vapor condensation.

One of the objects of this invention is to obviate the above disadvantages by replacing metal duct and pipe with a plastic molded duct as described below.

Pipes constructed of plastics have generally been regarded as too expensive to enter the duct field in competition with metal ducts. Most of these have been extruded and therefore could not utilize any form of slip joint.

The present invention is based upon the development of a duct or pipe construction suitable for duct uses and employing a very low cost thermo-plastic such as asphalt base or polymers derived from petroleum, generally with a fibrous or metallic filler material, and having a bell and slip joint that makes it possible to seal the duct and to provide integral rigidity where desired. The pipe sections are formed to accurate dimension by injection molding under pressure whereby a bell can be formed at one end.

Because of the very close tolerances possible with respect to dimensions, a bell slip joint can be provided with as low a clearance to diameter ratio as one to six hundred (1:600) or about .005" clearance on a side between the bell and spigot for a 3" diameter duct. The suitable maximum clearance to diameter ratio would be 1:300. Metal pipe cannot be made to such close tolerances without expensive machining.

The small clearance in the joint provides a rigidity for the slip joint that is not present in other constructions. It also restricts the passage of silt while permitting water seepage when used for underground purposes such as drain tile or electrical conduit covering.

The injection molded tubular bodies are joined end to end by telescoping the bell and spigot so that the bell receives the plane spigot end of the adjacent tubular body.

Furthermore, the pipe may be readily sealed and made integral when assembled by filling the small clearance crevice between the bell and spigot with a glue or adhesive that is compatible with the pipe material employed. The glue should have a solvent carrier that will penetrate the adjacent surface of the pipe and in time be absorbed leaving the glue set to its full strength and rigidly joining the bell and spigot. The small clearance space for receiving the glue reduces the possibility that any portion of the glue will be so thick as to prevent a proper absorption of the solvent by the adjacent pipe material and consequent failure of some portion of the glue to set. In addition the small clearance of the slip joint assists in distribution of the glue due to capillarity of the same in the joint. Where the pipe is constructed of an asphalt material a rubber base glue having a solvent compatible with the asphalt, may be employed.

The glue should be applied as with a brush to one or both of the mating surfaces of the slip joint prior to assembly. The glue, thus applied, serves also as a lubricant for facilitating assembly. After assembly the absorption of the solvent carrier by the adjacent pipe material makes the latter somewhat tacky so that the glue is thoroughly wetted to the pipe surfaces.

Where it is desired to avoid extrusion of excess glue inwardly of the pipe at the crevice between the end of the pipe and the inner shoulder of the bell, the invention provides an annular recess in the shoulder for receiving the excess glue. This makes it possible to employ substantially plane ends for the spigot as is desirable where the sections are cut to shorter lengths in the field.

The accompanying drawings illustrate the invention in its several aspects constituting the best mode presently contemplated therefor.

In the drawings:

Figure 1 is a side elevation of the injection mold employed in manufacturing the pipe, with parts broken away and sectioned;

Fig. 2 is a top plan view of the mold with parts broken away;

Fig. 3 is an enlarged detail longitudinal section of one side of a bell slip joint;

Fig. 4 is an enlarged detail longitudinal section of a pipe with an annular recess showing parts ready to be assembled and having glue thereon;

Fig. 5 is a similar section showing the parts after assembly;

Fig. 6 is a view similar to Fig. 4 showing a modified type of seal application;

Fig. 7 is a view similar to Fig. 5 showing the assembled joints for the parts of Fig. 6; and Fig. 8 is an enlarged detail longitudinal section of a pipe joint, showing a tapered bell and slotted spigot.

In carrying out the invention the asphalt and filler are first mixed in the desired proportions which may range from a filler content of 30% down to no filler at all. In general, the higher the filler content the stiffer and harder the pipe, and the lower the filler content the more impervious and brittle is the pipe.

The asphalt selected should be of a high melting point type. A 300° F. melting point asphalt has been found satisfactory. Other organic plastic materials might be employed.

The filler selected should be one that is generally fibrous in nature. Asbestos fibers have been found to be very satisfactory. In some cases glass fiber, wood, or other cellulosic fibers may be employed. In any case the filler material should be thoroughly dried to eliminate free moisture.

The material is heated to a temperature above the melting point of the asphalt or other binder and then injection molded into a pipe section as shown in Figure 1. Where a mixture of asphalt and asbestos is employed a temperature of about 400–500° F. has been found satisfactory.

In the injection molding process the material is forced under a pressure of from 500–5000 pounds per square inch into the mold 1 which has the shape of the pipe section to be formed.

The mold 1 comprises an outer cylindrical housing and an inner cylindrical core or plug which cooperate to provide a cavity embodying the bell 2 and the spigot portion 3 of the pipe section when filled. The spigot end of the mold is closed to provide a radial flow gate 4 which extends outwardly of the axial material discharge opening 5 for entrance of material to the mold, thus eliminating knit lines that may weaken the molded piece.

Material may be supplied to the mold by any suitable means, a schematic showing of one means being shown in Figure 1. The heated material is placed in a hopper 6 beneath which is a cylinder 7 and ram 8. The ram 8 forces the material, under pressure, through a duct 9 and into mold 1. Hopper 6 may be supplied with any suitable heating means, such as a heating coil, not shown, to keep the material therein at the proper molding temperature.

The flow of material is symmetrical and the pressure involved aids in maintaining the housing and plug of the mold concentric, thereby providing close dimensional tolerances as to cross sectional shape and thickness. This is true for both round and rectangular pipes, and in fact for most symmetrical shapes.

The mold 1 should be kept about 250° F. below the temperature of the molten plastic material during the molding process and suitable ducts 10 are provided in the housing and plug for connection to a source of temperature controlled fluid for this purpose if needed.

The pipe section is removed from the mold by axially separating the plug and housing, a slight shrinking of the material facilitating withdrawal of the molded pipe from the housing. The plug is subsequently removed from the molded piece.

The closed spigot end of the pipe is then cut off to the desired length and the pipe section is ready for use without further treatment. The bell is of substantially uniform section from end to end.

The pipe is light in weight and is generally competitive for duct purposes and for special purposes as where more expensive metal pipe is needed. The pipe is resistent to certain types of corrosion and is not susceptible to electrolytic corrosion as in soils.

Referring to the assembly of pipe, the close fit of the bell and spigot ends made possible by the accurate molding of the same provides a rigidity of the assembled joint not attainable with metal pipe. This makes the pipe useful for underground conduit housings where it is desired to avoid stressing of the cables and to provide restricted seepage and preventing silt movement to the joint.

As illustrated in Fig. 3, the joint comprises the bell 2 and spigot end 3 assembled with the latter fitting closely within the bell and with the spigot end generally seated against the internal shoulder 11 of the bell. Where the overlap of the bell 2 and spigot 3 is greater, rigidity of the joint is increased. In general, an overlap or bell length of about two inches will be satisfactory for most duct purposes.

The clearance between the bell and spigot can be maintained as low as .005" on a side for pipe of 3½ inch diameter. Wall thickness from about ⅟₁₆" up can be provided.

The low thermal conductance of the material makes it particularly suitable for warm air furnace ducts and the like and for air conditioning ducts.

If desired, the joints may be sealed as shown in Figs. 4 and 5. For this purpose either the inside of bell 2 or the outside of spigot 3 or both are coated with a thin layer 12 of mastic such as a "Ruberoid" asphalt paint #2 of low viscosity having a solvent or carrier which is compatible with the material of the pipe.

As the bell and spigot are thereafter assembled by slipping the spigot end axially into the bell the end of the spigot tends to push some of the mastic or glue ahead of it, leaving only the right amount to substantially fully fill the small clearance space between the bell and spigot.

The excess glue is collected in an annular groove or recess 13 at the internal shoulder of the bell, which keeps the glue from forming protrusions on the sinside of the pipe at the joint.

As shown in Figs. 4–7, the face of the internal shoulder of the bell is at an angle of approximately 15° and slopes downwardly toward recess 13 so that on fitting the two ends together, the glue is forced into the recess and doesn't tend to spill out into the interior of the duct.

Other forms of recesses are contemplated as being within the scope of the invention.

The solvent of the glue penetrates the adjacent pipe surfaces and makes the asphalt thereof tacky so that the parts become integral and in time the solvent is so distributed in the pipe material as to effect substantial setting of the glue and complete the joint. A satisfactory solvent for this purpose is xylene, which is employed in asphalt paints.

Because the body of glue present is so thin, being restricted to the clearance between the bell and spigot, only a very little solvent need be absorbed into the pipe surfaces, and the glue becomes set fairly quickly.

Where it is desired to seal the joint and retain the same for possible disassembly at some future time, the groove 13 is first filled with a mastic as shown in Fig. 6 and then the parts are assembled as shown in Fig. 7. The mastic in groove 13 generally stays pliable and a part of it extrudes into the clearance between the bell and spigot during assembly. Such a joint is sealed, but is not as rigid or permanent as the joint of Fig. 5, and can be disassembled if necessary.

A different embodiment of a joint using injection molded thermoplastic tubular duct is shown in Fig. 8. Here the inside surface of the bell is formed with a slight taper 14 for a short distance ahead of shoulder 11. This taper to a smaller diameter may be about .01 inch in .25 inch of pipe when the pipe has a 3.5 inch inside diameter. The male or spigot end of a similar pipe is then provided with a plurality of longitudinal slots 15 which are spaced circumferentially around the spigot end. Slots 15 extend a distance corresponding to the length of taper 14 and allow for shrinkage when bell 2 and spigot 3 are fitted together and assure that the spigot is always driven home until its end engages the shoulder 11 of the bell. After the joint is made, the spigot end is held rigid by compression of the slotted portion thereof by the tapered portion of the bell.

Various modes of carrying out the invention are contemplated as within the scope of the folowing claims particularly pointing out and distinctly claiming the subject matter which is regarded as the invention.

We claim:

1. A tubular duct formed of thermo-plastic material which is generally rigid, comprising a plurality of tubular sections joined end to end by telescoping bell and spigot joints, the bell on one end of each section having an internal abutment shoulder for determining the necessary telescoping action in assembly of the sections and having a slight inward taper of its inner surface just ahead of the abutment, said taper extending radially from a diameter greater than the external diameter of the spigot by an amount corresponding to the necessary clearance in assembling the spigot into the bell to a diameter less than the external diameter of the spigot, and the spigot end of each section having longitudinally extending slots therein of a length corresponding substantially with the length of said taper to provide for a slight yielding of the end of the rigid spigot and effect a gripping of the same when driven home in the bell, said taper and said yielding of the spigot providing for the abutment of the spigot end against the abutment shoulder in each case without regard to dimensional tolerances, and the small clearance between the inside of the bell and the spigot and the length of the same preventing ready loosening of the sections after assembly.

2. The structure of claim 1 in which a mastic material having a solvent capable of penetrating the thermoplastic material of the structure is incorporated in the joints in the clearance space between the bell and spigot to seal the same and additionally prevent loosening as from vibration.

(References on following page)

References Cited in the file of this patent

UNITED STATES PATENTS

| | | |
|---|---|---|
| 619,556 | Fraser | Feb. 14, 1899 |
| 1,890,998 | Lindquist | Dec. 13, 1932 |
| 1,986,010 | O'Laughlin | Jan. 1, 1935 |
| 2,358,291 | Fentress | Sept. 12, 1944 |
| 2,498,831 | Veitch | Feb. 28, 1950 |
| 2,517,778 | Fischer | Aug. 8, 1950 |
| 2,776,151 | Harkenrider | Jan. 1, 1957 |

FOREIGN PATENTS

| | | |
|---|---|---|
| 261,168 | Great Britain | Nov. 18, 1926 |
| 740,161 | Great Britain | Nov. 9, 1955 |